United States Patent
Hwa et al.

[11] Patent Number: 6,121,750
[45] Date of Patent: Sep. 19, 2000

[54] TWO TERMINAL BATTERY

[75] Inventors: Godwin Hwa, Hong Kong, The Hong Kong Special Administrative Region of the People's Republic of China; Ian G. Mawston, Auckland, New Zealand

[73] Assignee: Glory Win International Group Limited, Kowloon, The Hong Kong Special Administrative Region of the People's Republic of China

[21] Appl. No.: 09/207,549

[22] Filed: Dec. 8, 1998

Related U.S. Application Data

[60] Provisional application No. 60/069,140, Dec. 9, 1997.

[51] Int. Cl.$^7$ .............................. H02J 7/00; H01M 12/00; H02G 3/00
[52] U.S. Cl. .............................. 320/104; 320/107; 429/9; 307/10.1
[58] Field of Search ..................... 320/104, 107, 320/126; 429/9; 307/10.1

[56] References Cited

U.S. PATENT DOCUMENTS

| | | | |
|---|---|---|---|
| 1,782,940 | 11/1930 | Saives . | |
| 3,758,345 | 9/1973 | Toth | 136/181 |
| 5,002,840 | 3/1991 | Klenenow et al. | 429/9 |
| 5,108,848 | 4/1992 | Kramer | 429/9 |
| 5,162,164 | 11/1992 | Dougherty et al. | 429/9 |
| 5,164,273 | 11/1992 | Szasz et al. | 429/123 |
| 5,169,732 | 12/1992 | Beldock et al. | 429/150 |
| 5,169,735 | 12/1992 | Witehira | 429/160 |
| 5,316,868 | 5/1994 | Dougherty et al. | 429/9 |
| 5,525,891 | 6/1996 | Meyer et al. | 320/128 |
| 5,635,771 | 6/1997 | Mertl et al. | 307/10.7 |
| 5,844,325 | 12/1998 | Waugh et al. | 307/10.7 |
| 5,866,274 | 2/1999 | Mawston et al. | 429/9 |
| 5,977,652 | 11/1999 | Frey et al. | 307/10.1 |

FOREIGN PATENT DOCUMENTS

| | | |
|---|---|---|
| 55-165582 | 12/1980 | Japan . |
| 57-167844 | 10/1982 | Japan . |
| 59-134005 | 8/1984 | Japan . |
| 4-39872 | 2/1992 | Japan . |
| 5-24489 | 2/1993 | Japan . |
| 5-115128 | 5/1993 | Japan . |
| 5-258656 | 10/1993 | Japan . |

*Primary Examiner*—Peter S. Wong
*Assistant Examiner*—Gregory J. Toatley, Jr.
*Attorney, Agent, or Firm*—Seidel, Gonda, Lavorgna & Monaco, PC

[57] ABSTRACT

A two terminal dual battery with a micro-processor base controller is incorporated into a single unit. Two 12 volt batteries are contained in a single housing sharing a common negative terminal and a single positive terminal. The auxiliary battery is permanently coupled to the external terminals of the battery. A starter section may be coupled to the external battery terminals in parallel with the auxiliary section using a latching electromechanical relay. The relay is controlled by the micro-processor in response to external inputs and battery parameters. One section of the battery is constructed for deep cyclic uses and normally provides power to run auxiliary loads while the other battery section is constructed to fulfill requirements of low internal resistance and efficient low duration high current output.

8 Claims, 7 Drawing Sheets

TWO TERMINAL BATTERY

This application claims benefit of Provisional Application Ser. No. 60/069,140 filed Dec. 9, 1997.

FIELD OF THE INVENTION

The present invention is directed to a two terminal battery, useable for example in an automobile. The present invention is more particularly directed to a two terminal battery including dual batteries within a single case having two terminals.

BACKGROUND OF THE INVENTION

The automobile industry is continuously looking for new methods and systems which will provide an intelligent car battery capable of taking into account the activity of the car in order to more efficiently and effectively provide power for operating the various systems within the increasingly more complicated automobile. Intelligent batteries in general are known in the art. The intelligent batteries typically consist of twin 12-volt batteries, for example, of the lead acid variety. Previous designs have three and four external poles requiring rewiring of conventional automobile battery systems upon installation. The development of a two pole intelligent battery system with dual batteries but only two external terminals provides several advantages. Clearly the use of two terminals instead of three or four obviates the need for wiring harness modifications and installation costs to conventional battery wiring systems. Improved performance and reliability over conventional batteries are thereby easily available.

SUMMARY OF THE INVENTION

The present invention is directed to a two terminal dual battery system for use in an automobile. The system includes a housing unit which holds dual batteries and a microprocessor based controller requiring only two external terminals for connection to a typical automobile battery wiring system. The two batteries, contained within a single case, share a common negative external terminal and a single positive external terminal. One of the batteries is permanently connected to the external terminals and the other battery, while permanently connected to the negative external terminal, is coupled to the positive external terminal via a electromechanical latching relay which when activated connects both batteries in parallel. The operation of the latching relay is controlled by a micro-processor operating under a control algorithm. The micro-processor operates in response to external parameters and sensed internal battery parameters. The relay is a pulse operated bi-stable state electro-mechanical relay. The relay also incorporates a state sensing electrode to give fully closed loop logic verification. All relay state transitions are variable time buffered with the main program containing appropriate degrees of redundancy and fail safe back-up systems.

One of the battery sections is constructed for deep cyclic uses. This battery section is permanently connected to the external terminals and normally provides power to run auxiliary loads. The second battery section is constructed to fulfill requirements of low internal resistance and efficient short duration high current output. The second section is periodically connected to the external positive terminal via the latch relay.

DETAILED DESCRIPTION OF THE PREFERRED EMBODIMENT

Figure 1:
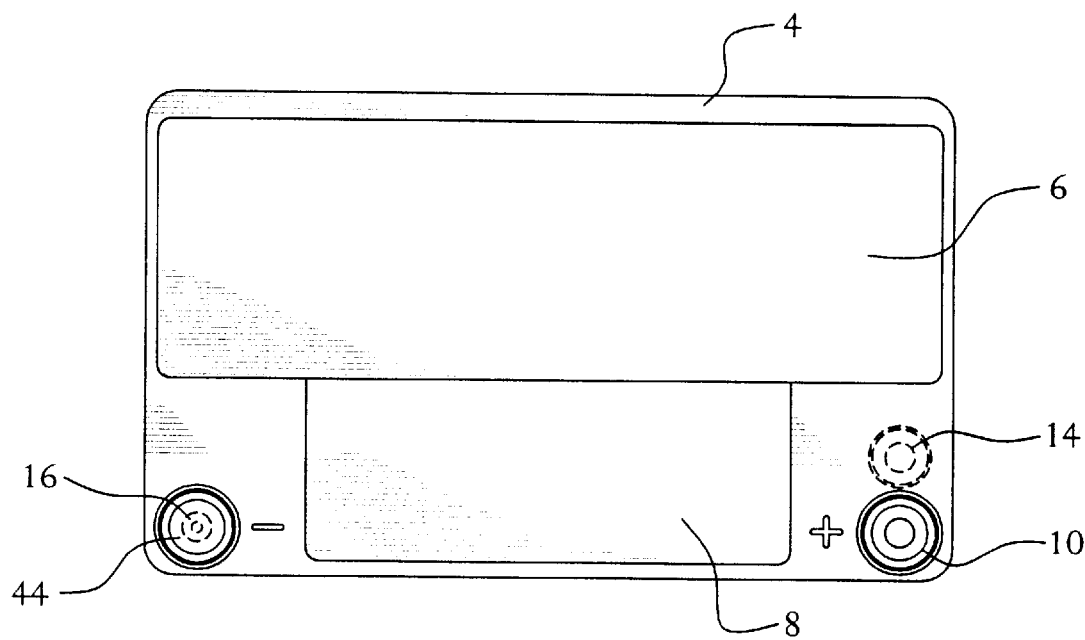
FIG. 1 is a top view of the exterior of the battery of one embodiment of the present invention.
Figure 2:
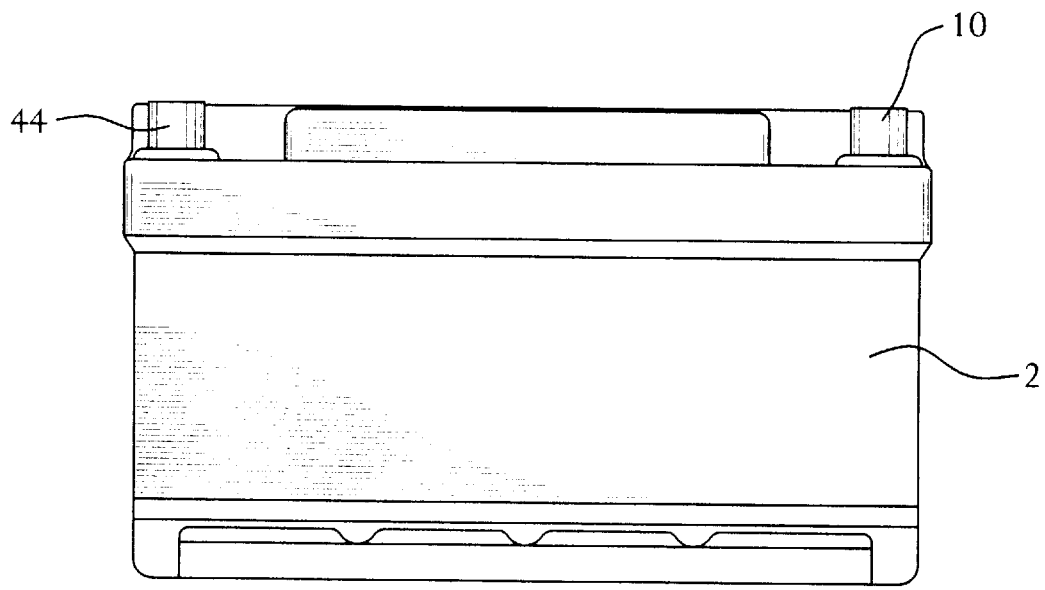
FIG. 2 is a side elevation view of the exterior of the battery of FIG. 1.
Figure 3:
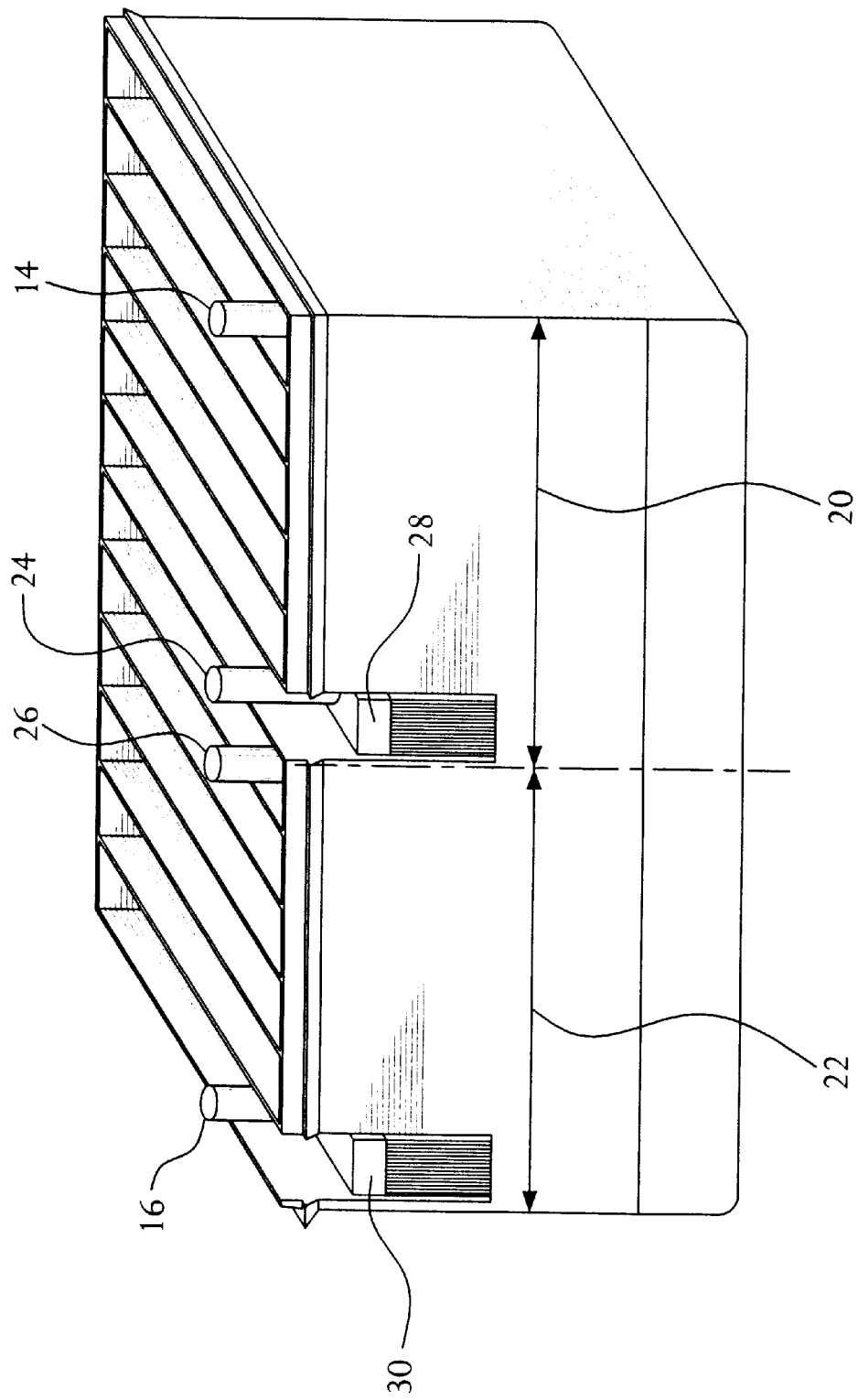
FIG. 3 is an isometric view illustrating the interior elements of FIG. 1.

Referring to the drawings, wherein like numerals indicate like elements, there is shown in FIGS. 1 and 2 a two terminal dual battery apparatus according to a preferred embodiment of the present invention. The battery includes an external molded battery case 2 and lid 4. Incorporated into the lid 4 is an integral ventilation system 6. Also integrated into the lid 4 is a switch box 8 containing various electronics (discussed below). A first external terminal 10 serves as the positive terminal and extends from the lid 4. A second external terminal 44 acting as the negative terminal also extends from the lid 4. FIG. 3 illustrates the internal elements of the battery including a starter section 20 and an auxiliary section 22 adjacent thereto. The starter section 20 includes a positive pole 14 and a negative pole 24. The starter section 20 has six plate groups 28 for providing high current duty. The auxiliary section 22 includes a positive pole 26 and a negative pole 16. The auxiliary section 22 has six plate groups 30 for providing cyclic duty. The individual battery sections 20 and 22 may be lead acid batteries for providing the type of duty described above.

Figure 4:
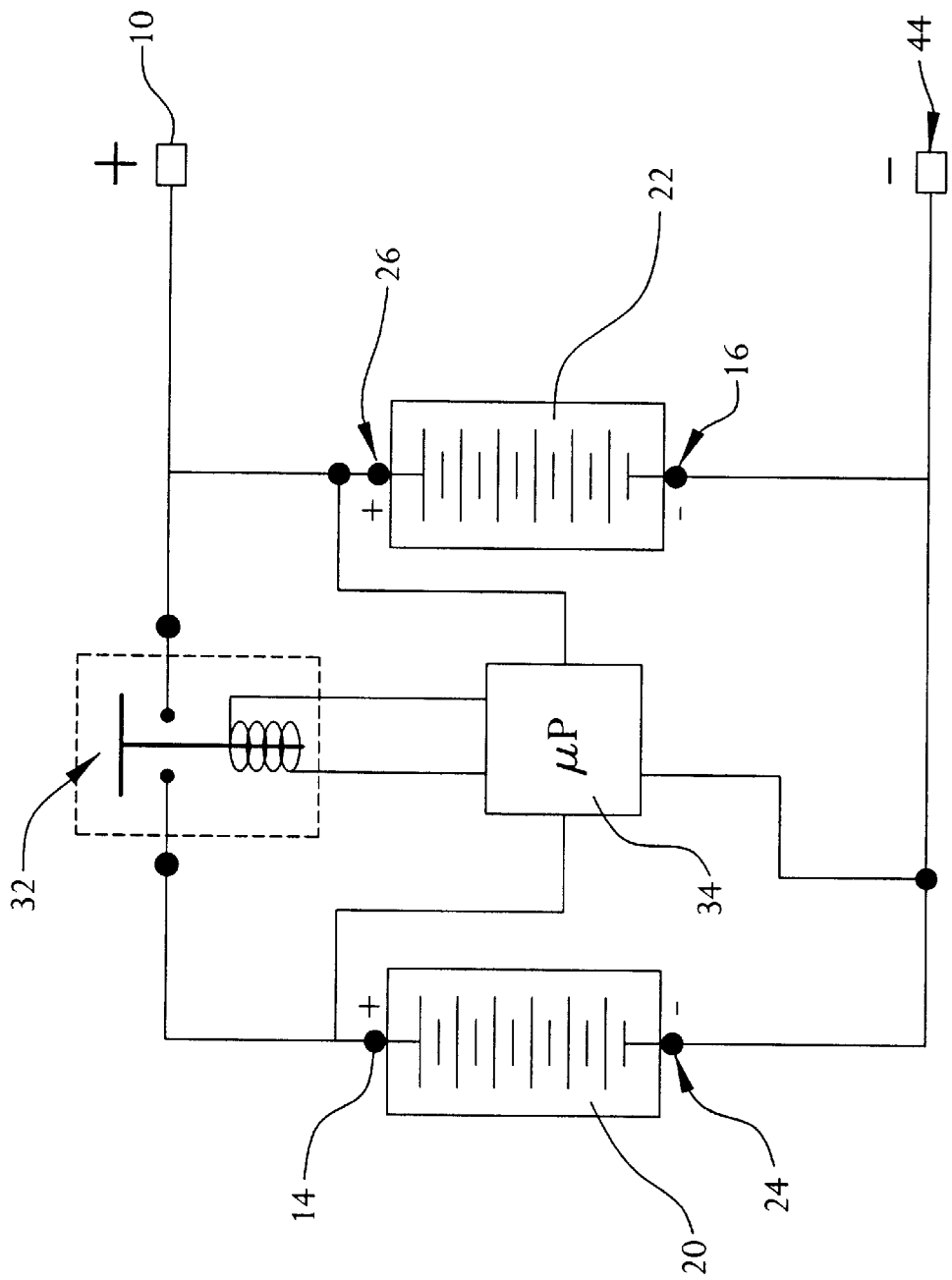
FIG. 4 is a simplified electrical diagram of the embodiment of FIG. 1.

A simplified electrical diagram of the preferred embodiment of the present invention is illustrated in FIG. 4. The starter section 20 and the auxiliary section 22 are electrically coupled in parallel between external positive terminal 10 and external negative terminal 44. A latching electromechanical relay (L/R) 32 is connected between the starter section positive pole 14 and the auxiliary section positive pole 26. The L/R 32 is also electrically connected to a micro-processor and a control electronics section 34. The micro-processor and control electronics section 34 is electrically connected to the starter section positive pole 14, the auxiliary section positive pole 26, the starter section negative pole 24, and the auxiliary section negative pole 16. In response to input signals, the micro-processor and control electronics section 34 opens and closes the L/R 32. When the L/R 32 is opened, only the auxiliary section 22 is connected to the external battery terminals 10, 44. When L/R 32 is closed, both the starter section 20 and the auxiliary section 22 are connected in parallel across the external battery terminals 10, 44.

Figure 5:
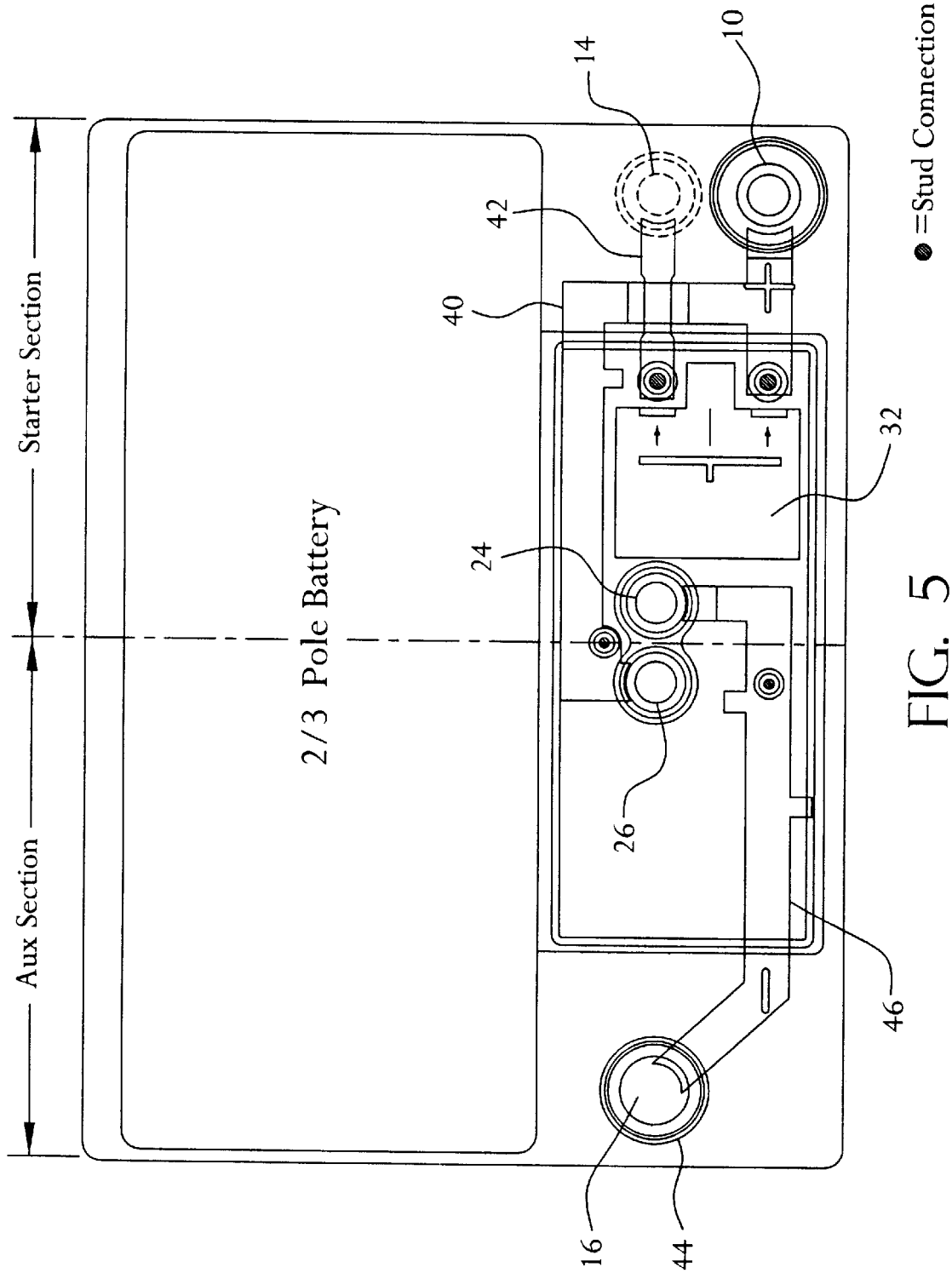
FIG. 5 is an external top view of the preferred embodiment of FIG. 1, illustrating embedded conductors, a latching relay, and internal battery poles.
Figure 6:
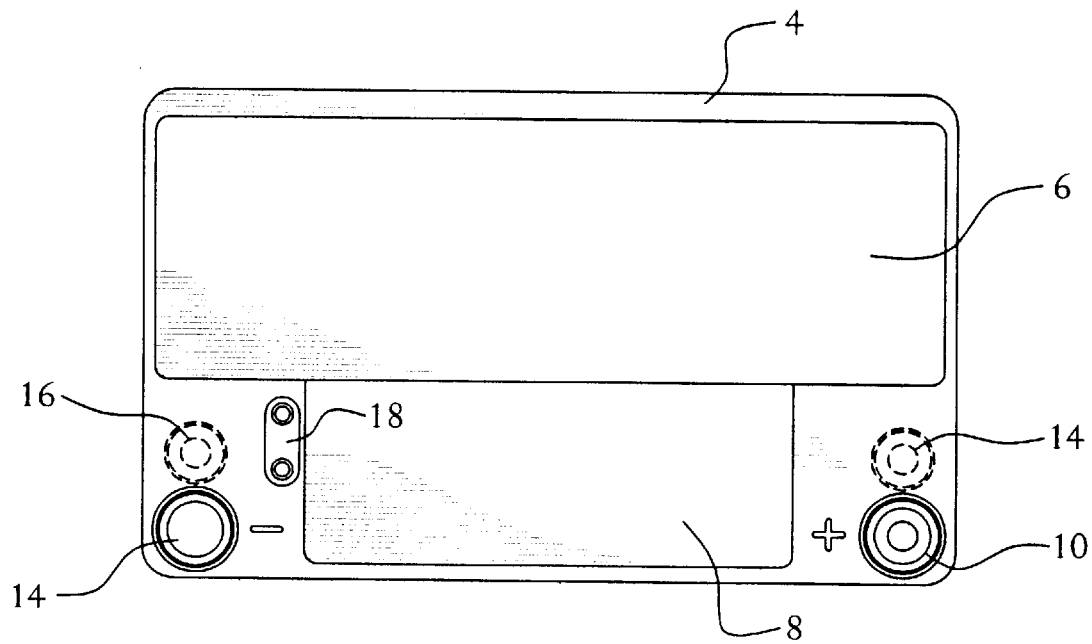
FIG. 6 is a top view of the exterior of a battery of another embodiment of the present invention.
Figure 7:
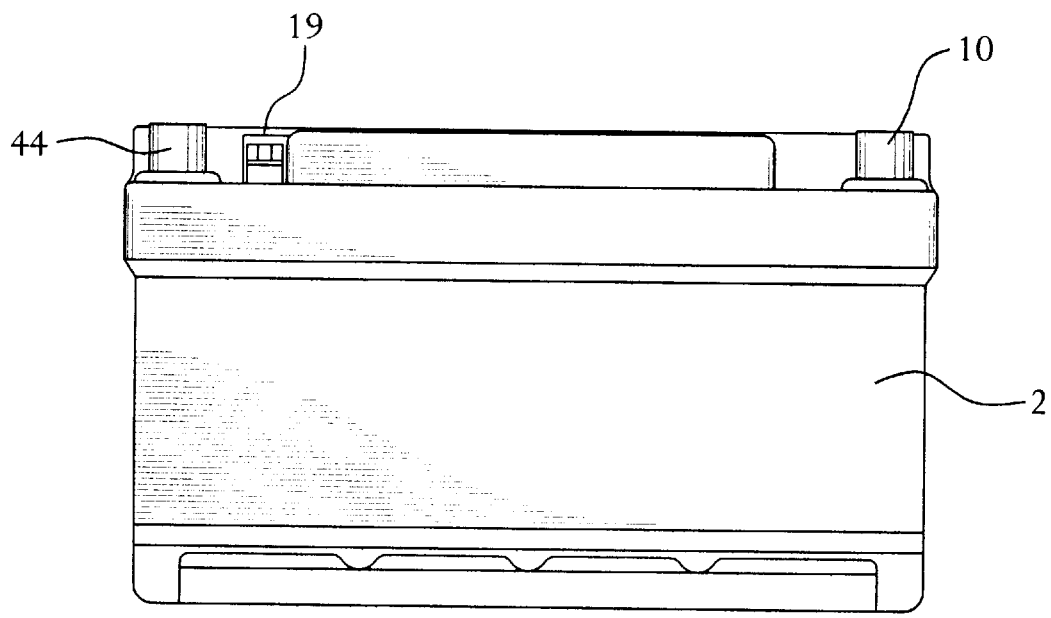
FIG. 7 is a side elevation view of the exterior of the battery of FIG. 6.
Figure 8:
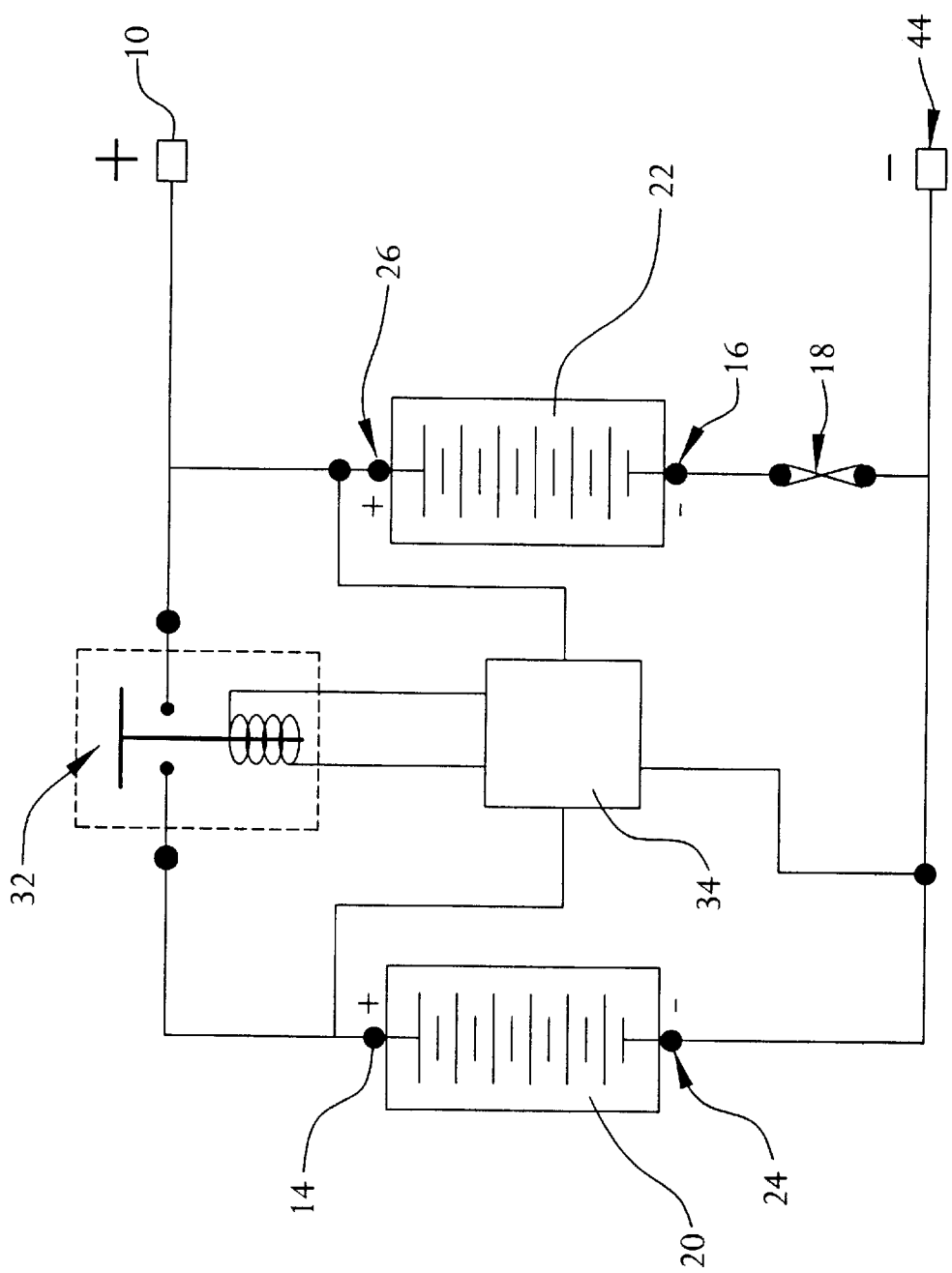
FIG. 8 is a simplified electrical diagram of the embodiment of FIG. 6.

The conductor connections linking the internal poles of the starter and auxiliary sections to the external poles are illustrated in FIG. 5. The starter section positive pole 14 is linked to L/R 32 by a conductor 42. Another conductor 40 links the auxiliary section positive pole 26 to the external positive terminal 10 and the L/R 32. Yet another conductor 46 links the starter section negative pole 24 to the external negative terminal 44. The external negative terminal 44 is positioned above the auxiliary section negative pole 16 and is coupled thereto.

Figure 9:
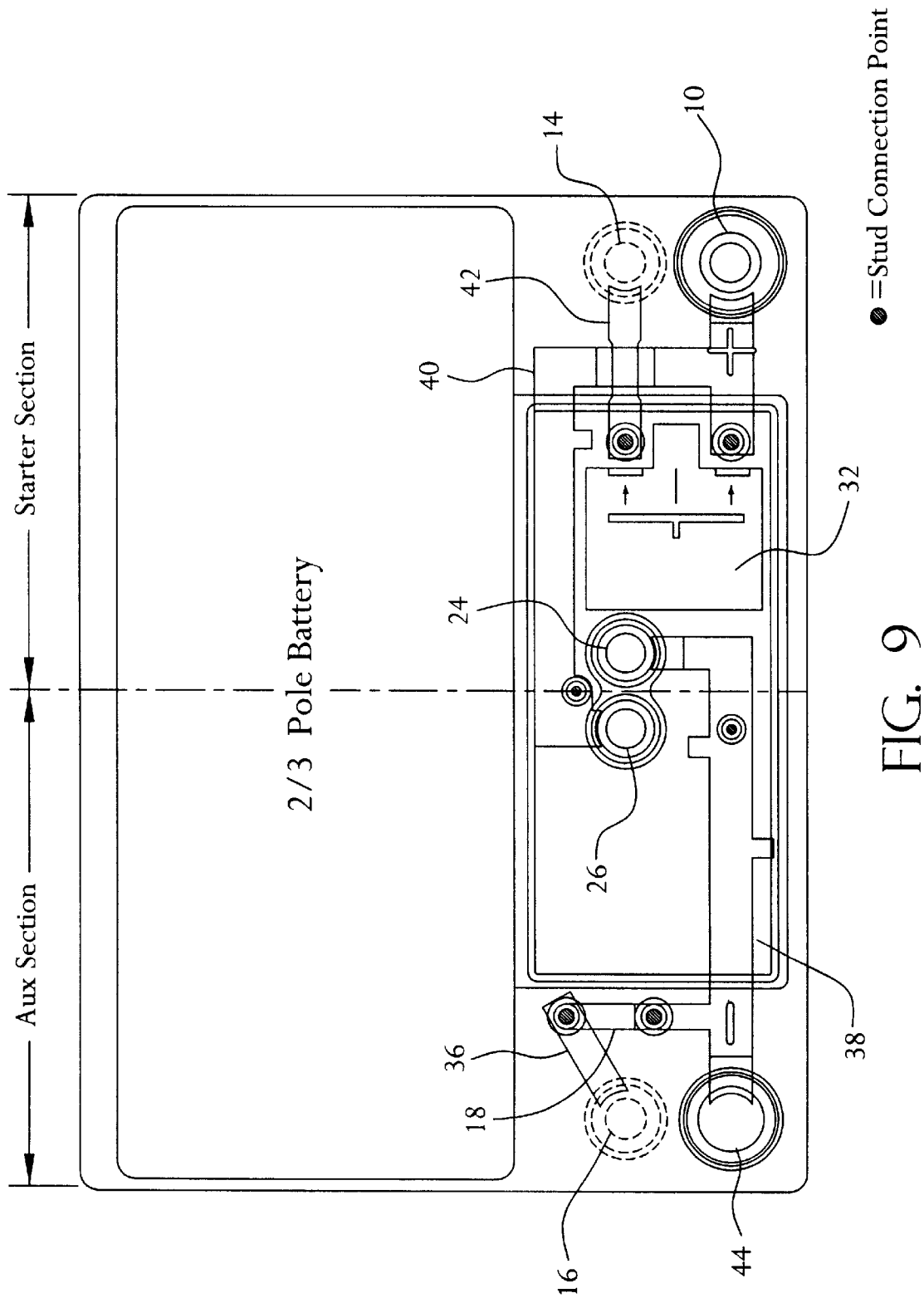
FIG. 9 is an external top view of the preferred embodiment of FIG. 6, illustrating embedded conductors, a latching relay, and internal battery poles.

In another preferred embodiment, illustrated in FIGS. 6–9, the present invention includes an optional external negative pole link 18. As shown in FIG. 9, the pole link 18 couples the auxiliary section negative pole 16 to yet another conductor 38 which is coupled the external negative terminal 44 and to the starter section negative pole 24.

The micro-processor and control section 34 (hereinafter referred to as "the $\mu P$") monitors and detects various operating conditions of the battery. Based upon these conditions the $\mu P$ 34 controls the L/R operation.

The $\mu P$ 34 continuously monitors the following parameters: the auxiliary (AUX) section voltage ($V_a$), the starter (STA) section voltage ($V_s$), a vibration sensor output, the AUX section current, a contact state of the L/R, a condition of various state flags and various timers.

When necessary, signals input to the $\mu P$ 34 are preconditioned in various conventional ways, for example, R-C filtering. For example, in the case of vibration detection, a raw signal is filtered for frequency response, rectified and combined in the $\mu P$ 34 with a 30 second backward looking time signal to establish a valid <u>D</u>etected <u>VIB</u>ration state and set DVIB=True.

Upon detecting parameter inputs which match preprogrammed conditions, the $\mu P$ 34 sends a signal to a L/R drive circuit to change the state of the L/R. The $\mu P$ 34 then verifies the result of the change of state. The L/R drive circuit may comprise, for example a FET in series with a L/R coil. The source of the FET is connected to the negative power rail. The relay coil is connected between the drain of the FET and the positive STA section terminal 14. A protective diode is connected in reverse bias and parallel with the coil to suppress inductive fly-back voltages.

To activate the L/R 32, the $\mu P$ 34 applies a voltage signal to the gate of the FET. The voltage signal activates the FET thereby allowing current to flow. The current activates the coil which in turn closes the L/R 32. To open the L/R 32 the $\mu P$ 34 discontinues the voltage signal to the gate of the FET.

In order to enable the $\mu P$ 34 to monitor the state of the L/R 32 a verify contact is included in the L/R housing. The verify contact is connected to the $\mu P$ 34. When the L/R 32 is closed the potential on the contacts of the L/R 32 is also present on the verify contact. The $\mu P$ 34 determines that the L/R 32 is closed or open based upon the potential at the verify contact. If the L/R 32 is to be closed, the $\mu P$ 34 sends a voltage to the FET. The $\mu P$ 34 then monitors the verify contact. If the $\mu P$ 34 does not detect a potential at the verify contact it will pulse the FET again. It will repeat the pulse up to 15 times or until the L/R 32 closes. If the L/R 32 is not verified as having closed after 15 attempts, the $\mu P$ 34 takes no further action until receipt of a valid instruction to open the L/R 32 from an "assumed closed" state. Re-verification takes place after cessation of the "opening" current pulse has been applied to the L/R 32 and an verification attempts register is reset to zero.

Generally, the battery operates in five states recognized by the $\mu P$ 34: (A) idle or open-circuit, where little or no discharging or charging occurs: $10.8V<V_a<13V$, (B) starting, high current, low voltage, short time period discharge, (C) charging $13V<V_a<14V$ for less than 40 minutes, (D) overcharging $V_a>14V$ and $V_{reg}>V_c>13.2V$, where $V_{reg}$ is the voltage of a system regulator and $V_c$ is the voltage across the STA section 20 and the AUX section 22 in parallel (E) deep discharging: $V_a \leq 10.8V$ for an extended period of time with or without vibration present.

The present invention operates in the following manner. As a starting condition the battery is in state A. Both the STA section 20 and the AUX section 22 of the battery are fully charged (normal state) and the L/R is in an open state. In this state, only the AUX section 22 is connected to a vehicle wiring system coupled to the battery via the external terminals 10, 44.

The vehicle includes a vibration sensor (not shown) connected to the $\mu P$ 34. The vibration sensor may be a piezo electric vibration detector circuit, for example. When the vehicle is entered, the vibration associated with opening the door or other disturbances will be detected by the vibration sensor. In turn, the $\mu P$ 34 sets a "vibration detected" flag (DVIB) to true.

The $\mu P$ 34 checks $V_a$. Since the $\mu P$ 34 will find $V_a>10.8V$, the present battery configuration will be maintained, i.e., only the AUX section connected to a starter motor. A key is set to a start position engaging a starter solenoid to turn the starter motor. The high current drawn by the starter motor will cause the AUX section voltage $V_a$ to decrease. The $\mu P$ 34 monitors $V_a$. If $V_a$ remains above a first trigger point (10.8V for example) then the car will most likely start. If the car starts the $\mu P$ 34 will not close the L/R 32. Once the vehicle starts and the starter motor load is removed, an alternator charges the AUX section, raising $V_a$.

If, however, $V_a$ drops below 10.8V, the $\mu P$ 34 will close the L/R 32, thereby combining the AUX section 22 and the STA 20 section in parallel for a greater combined voltage $V_c$. The combination of DVIB=True and $V_a<10.8V$ monitored by the $\mu P$ 34 causes the $\mu P$ 34 to close the L/R 32. The starter motor is now driven by the combined voltage $V_c$. Once the vehicle starts, the alternator will charge both the STA section 20 and the AUX section 22 in parallel.

In the situation wherein a user enters a vehicle (DVIB= True) and attempts to start the vehicle, if the $\mu P$ 34 finds $V_a$ is initially less than 10.8V, the $\mu P$ 34 will automatically close the L/R 32 thereby combining the AUX section 22 and the STA section 20 before the starter solenoid is engaged. This will ensure the best condition for starting the engine.

As stated above, when the vibration sensor senses a vibration, the $\mu P$ 34 sets DVIB=True. The $\mu P$ 34 also sets a counter to count to 30 seconds once the vehicle has started. If the L/R 32 has been closed (due either to initial finding of $V_a<10.8$ V or $V_a$ dropping below 10.8V as a result of start attempts) and no additional vibration is sensed during the 30 second period, DVIB will be set to false. If charging parameters, discussed below, do not require keeping the L/R closed, the $\mu P$ 34 will open the L/R 32 and disconnect the STA section 20 from the AUX section 22.

Under certain circumstances the vibration sensor will not register an entry to the vehicle, e.g., sensor inoperable, entry vibration insignificant, etc. or 30 seconds may elapse between entry and a start up attempt. In either case, DVIB will be set to false. Therefore, an initial condition DVIB= True necessary for engine starting will not be present. If $V_a<10.8V$, both battery sections are necessary to start the engine. However, because DVIB=False, the L/R 32 will not close. An additional back-up circuit, connected to $V_a$ and the $\mu P$ 34 addresses this circumstance. The $\mu P$ 34, through the back-up circuit, monitors the rate of fall of $V_a$ ($dV_a/dt$) and $V_a$. If $dV_a/dt$ exceeds a preselected value and $V_a$ falls below a preselected value, the $\mu P$ 34 will close the L/R 32. At this point, closure of the L/R 32 is not dependent on the status of DVIB.

Once the vehicle is started, the μP 34 begins to monitor charging parameters. As discussed above, the L/R 32 may or may not be closed once the vehicle is started, depending upon the value of $V_a$. The μP 34 monitors $V_a$. If $V_a$ rises above 13V through recharging by the alternator charging system, the μP 34 will check the status of the L/R 32. If it is closed, it will remain closed and if it is open, the μP 34 will signal it to close. Once the L/R is closed, the charging system will charge both the AUX section 22 and the STA section 20, restoring both sections to their normal state of charge raising $V_c$ to a maximum value, as set by an external vehicle voltage regulator.

If the L/R 32 is closed and the engine continues running, both battery sections are charged with the voltage ultimately reaching a constant value, as determined by the vehicle's voltage regulator, for example, 14.2–14.7 volts. Under these conditions, excessive and prolonged charging of the STA section 20 may cause positive grid corrosion. To address this effect, the μP 34 implements a charge protection voltage (CPV) function. If $V_c$ exceeds 14V, the μP 34 sets a timer for a preselected period T1, for example, 40 minutes. If $V_c$ remains greater than 14V for the period T1 the μP 34 opens the L/R 32. Once the STA section 20 is disconnected by opening the L/R 34, $V_s$ naturally decays to an equilibrium potential, for example, 13.2 volts. When the μP 34 detects $V_s$ has reached the equilibrium potential, the μP 34 closes the L/R 32 and sets a timer for a preselected period T2, for example, 5 minutes. During this period the STA section 20 and the AUX section 22 charge in parallel. At the end of the period T2, the μP 34 will open the L/R 32 again allowing the STA section voltage $V_s$ to decay. Once $V_s$ falls below 13.2 volts the μP 34 will set the timer to period T2 again. The T2 period cycle will continue indefinitely until parameters require otherwise. For example, if $V_a$ falls below 12.8V the L/R 32 will be forced open for charging the AUX section 22 alone or if the engine is turned off, the L/R will be forced open. If $V_c$ falls below 13.2V during either period T1 or T2, the timer will be reset to zero so that the next counter implemented will be the one that is reset.

When the vehicle becomes idle, the voltages of both battery sections 20, 22 decay towards their normal open circuit values. When the AUX section voltage $V_a$ falls to the top end of this range, the L/R 32 is pulsed to the open state thus isolating the STA section 20 from any standing auxiliary loads that may be present.

It is preferred that the AUX section 22 provide current to auxiliary loads that are not or can not be supported by the charging system. If the vehicle is idle and an auxiliary load is present and the L/R 32 is open, then the AUX section 22 alone drives the load. Under this circumstance the STA section 20 is isolated and $V_a$ will steadily decrease with time. In a vibration-free situation, the AUX section 22 can be fully discharged. However, if $V_a$ falls below a trigger point, for example, 10.8 volts and a vibration is sensed by the vibration sensor, e.g., person entry, loud noises, etc. DVIB will be set to true and the L/R 32 will be closed. The AUX section 22 and the STA section 20 will be placed in parallel providing a common voltage $V_c$ (which is greater than 10.8V) to the auxiliary loads. The μP 34 monitors the vibration sensor for further vibrations. If no vibration is sensed for 30 seconds DVIB is set to false and the L/R 32 is opened. The μP 34 continuously monitors the vibration sensor. The process is repeated as called for by the vibration sensor.

This condition can occur, for example, if the vehicle is in use and there is a charging system failure or long term overburden. If no external input is detected when the auxiliary voltage $V_a$ falls below the trigger point, then the L/R 32 will remain in the open state and the AUX section 22 is allowed to discharge to completion. This condition typically occurs if the vehicle is idle and some accessory, e.g., lights, is left on.

The electronic circuits are dual supplied with current from both the STA section 20 and the AUX section 22. In the event voltage of both sections of the battery falls below 5 volts, then the μP 34 will enter a "sleep" mode. When the battery is placed on charge and voltage of the AUX section 22 alone or both sections together rises above a preset value, then the μP 34 will put the battery into an "awake" state by a reset and reinitialization circuit to resume normal operation.

The present invention may be embodied in other specific forms without departing from the spirit or essential attributes thereof and, accordingly, reference should be made to the appended claims, rather than to the foregoing specification, as indicating the scope of the invention.

What is claimed is:

1. A battery comprising:
   a battery housing,
   a first battery section housed in the battery housing,
   a second battery section housed in the battery housing adjacent to the first battery section,
   a pair of external terminals extending from the battery housing,
   a controllable switch having an open state and a closed state,
   a control device for selectively operating the controllable switch between the open state and the closed state in response to an input signal,
   wherein the first battery section is permanently connected across the pair of external terminals, and
   wherein the second battery section is connected across the pair of external terminals through the controllable switch such that when the controllable switch is in the closed state the first battery section and the second battery section are connected in parallel across the pair of external terminals.

2. A battery as recited in claim 1, wherein the first battery section is an auxiliary battery for driving auxiliary components.

3. A battery as recited in claim 2, wherein the auxiliary battery includes plate groups for providing cyclic duty.

4. A battery as recited in claim 1, wherein the second battery section is a starter battery for starting an engine.

5. A battery as recited in claim 4, wherein the starter battery includes plate groups for providing high current duty.

6. A battery as recited in claim 1, wherein the controllable switch is a latch relay.

7. A battery as recited in claim 1, wherein the control device closes the switch if the input signal indicates that the first battery section voltage is below a trigger point.

8. A battery comprising:
   a battery housing;
   a first battery section housed in the battery housing;
   a second battery section housed in the battery housing adjacent to the first battery section;
   a pair of external terminals extending from the battery housing;
   a controllable switch having an open state and a closed state;

a control device for selectively operating the controllable switch between the open state and the closed state in response to an input signal; and a vibration sensor;

wherein the first battery section is permanently connected across the pair of external terminals;

wherein the second battery section is connected across the pair of external terminals through the controllable switch such that when the controllable switch is in the closed state the first battery section and the second battery section are connected in parallel across the pair of external terminals; and wherein the input signal is representative of at least one of a voltage of the first battery section, a voltage of the second battery section, a current of the first battery section, a current of the second battery section, and a state of the vibration sensor.

* * * * *